US00RE48270E

(19) United States
(12) Reissued Patent
Seo

(10) Patent Number: US RE48,270 E
(45) Date of Reissued Patent: *Oct. 20, 2020

(54) OPENING DEVICE FOR REFRIGERATOR

(71) Applicant: Samsung Electronics Co., Ltd., Suwon-si, Gyeonggi-do (KR)

(72) Inventor: Yong Man Seo, Gwangju (KR)

(73) Assignee: SAMSUNG ELECTRONICS CO., LTD., Suwon-si (KR)

( * ) Notice: This patent is subject to a terminal disclaimer.

(21) Appl. No.: 16/230,255

(22) Filed: Dec. 21, 2018

Related U.S. Patent Documents

Reissue of:
(64) Patent No.: 8,398,185
Issued: Mar. 19, 2013
Appl. No.: 12/213,566
Filed: Jun. 20, 2008

U.S. Applications:
(63) Continuation of application No. 14/601,864, filed on Jan. 21, 2015, now Pat. No. Re. 47,236, which is an application for the reissue of Pat. No. 8,398,185.

(30) Foreign Application Priority Data

Jan. 11, 2008 (KR) ..... 10-2008-0003319

(51) Int. Cl.
*A47B 96/04* (2006.01)
*F25D 23/02* (2006.01)
(Continued)

(52) U.S. Cl.
CPC ..... *F25D 23/028* (2013.01); *E05B 17/0033* (2013.01); *E05F 11/54* (2013.01); *Y10T 16/458* (2015.01)

(58) Field of Classification Search
CPC .... F25D 23/028; F25D 23/02; F25D 2400/06; F25D 2323/021; F25D 2323/02;
(Continued)

(56) References Cited

U.S. PATENT DOCUMENTS 1,690,323 A * 11/1928 Barnhart ..... 62/424
2,029,197 A * 1/1936 Roedding ..... 292/221
(Continued)

FOREIGN PATENT DOCUMENTS

CN 1508500 A 6/2004
DE 9313978.0 U1 5/1994
(Continued)

OTHER PUBLICATIONS

Chinese Office Action dated Oct. 10, 2011 in corresponding Chinese Patent Application No. 200810127259.7.
(Continued)

*Primary Examiner* — Peter C English
(74) *Attorney, Agent, or Firm* — Staas & Halsey LLP

(57) ABSTRACT

A side-by-side refrigerator having a door opening device which includes a cabinet and a door to open and close a front surface of the cabinet, the door opening device comprising: a handle which is mounted on a front surface of the door to perform a seesaw motion; and a push kit which is mounted on a side surface of the door to interwork with the handle, wherein a portion on which the handle and the push kit are mounted is formed to be recessed in the door.

8 Claims, 7 Drawing Sheets

(51) Int. Cl.
*E05B 17/00* (2006.01)
*E05F 11/54* (2006.01)

(58) Field of Classification Search
CPC .... E05F 11/54; E05B 17/0033; E05C 19/161; Y10T 16/458; Y10T 16/459
See application file for complete search history.

(56) References Cited

U.S. PATENT DOCUMENTS

| | | | | | |
|---|---|---|---|---|---|
| 2,069,088 | A | * | 1/1937 | Geske et al. | 292/200 |
| 2,207,569 | A | * | 7/1940 | Wild | 292/169.14 |
| 2,309,049 | A | * | 1/1943 | Curtiss, Jr. et al. | 292/48 |
| 2,639,182 | A | * | 5/1953 | Jacobson | 292/332 |
| 2,652,277 | A | * | 9/1953 | Anderson | 292/332 |
| 2,659,115 | A | * | 11/1953 | Anderson et al. | 49/277 |
| 3,020,075 | A | * | 2/1962 | Johnstone et al. | 292/336.3 |
| 5,908,228 | A | * | 6/1999 | Lee | 312/405 |
| 5,915,805 | A | * | 6/1999 | Lee | 312/405 |
| 6,375,291 | B1 | * | 4/2002 | Nam et al. | 312/405 |
| 6,655,765 | B2 | * | 12/2003 | Kawamura et al. | 312/405 |
| 7,195,293 | B2 | * | 3/2007 | Ala | 292/254 |
| 7,784,219 | B2 | * | 8/2010 | Yoshikawa et al. | 49/379 |
| RE47,236 | E | * | 2/2019 | Seo | E05B 17/0033 |
| 2003/0090187 | A1 | | 5/2003 | Kawamura et al. | |
| 2006/0043852 | A1 | * | 3/2006 | Kwon | 312/405 |
| 2006/0103278 | A1 | * | 5/2006 | Bousquet | 312/332.1 |
| 2006/0152124 | A1 | * | 7/2006 | Pohl et al. | 312/406.2 |
| 2008/0000052 | A1 | * | 1/2008 | Hong et al. | 16/382 |
| 2008/0163462 | A1 | * | 7/2008 | King | 16/412 |
| 2009/0013501 | A1 | * | 1/2009 | Tomiji | 16/412 |
| 2009/0205357 | A1 | * | 8/2009 | Lim et al. | 62/441 |

FOREIGN PATENT DOCUMENTS

| | | | | |
|---|---|---|---|---|
| EM | 0230887 | A2 | | 8/1987 |
| EM | 1626235 | A3 | | 2/2006 |
| EP | 230887 | A2 | * | 8/1987 |
| EP | 0598979 | A1 | | 6/1994 |
| EP | 1524483 | A1 | | 4/2005 |
| JP | 10-73367 | | | 3/1998 |
| JP | 10-73367 | A | | 3/1998 |
| JP | 2004-116842 | A | | 4/2004 |
| KR | 1999-012388 | | | 4/1999 |
| KR | 1999-012388 | U | | 4/1999 |
| KR | 1999-0020194 | | | 6/1999 |
| KR | 1999-0020194 | U | | 6/1999 |
| KR | 2000034210 | | * | 6/2000 |
| KR | 2000034210 | A | | 6/2000 |
| KR | 2006082334 | | * | 7/2006 |
| KR | 2006082334 | A | | 7/2006 |
| KR | 2007062846 | | * | 6/2007 |
| KR | 2007062846 | A | | 6/2007 |

OTHER PUBLICATIONS

U.S. Office Action dated May 9, 2011 in corresponding U.S. Appl. No. 12/213,566.
U.S. Office Action dated Oct. 14, 2011 in corresponding U.S. Appl. No. 12/213,566.
U.S. Office Action dated Feb. 10, 2012 in corresponding U.S. Appl. No. 12/213,566.
U.S. Office Action dated May 29, 2012 in corresponding U.S. Appl. No. 12/213,566.
U.S. Notice of Allowance dated Nov. 23, 2012 in corresponding U.S. Appl. No. 12/213,566.
Partial European Search Report dated Sep. 8, 2015 issued in corresponding European Patent Application 08158192.8.
European Office Action dated Nov. 30, 2016 in European Patent Application No. 08158192.8.
European Office Communication dated Jul. 3, 2017 in European Patent Application No. 08158192.8.
European Office Action dated Dec. 11, 2017 in European Patent Application No. 08158192.8.
Extended European Search Report dated Apr. 19, 2018 in European Patent Application No. 17206489.1.
European Communication dated May 16, 2018 in European Patent Application No. 08158192.8.
English translation of KR 1999-012388 U published Apr. 6, 1999.
U.S. Notice of Allowance dated Sep. 10, 2018 in U.S. Appl. No. 14/601,864.
U.S. Office Action dated Apr. 26, 2018 in U.S. Appl. No. 14/601,864.
U.S. Notice of Allowance dated Dec. 12, 2017 in U.S. Appl. No. 14/601,864.
U.S. Office Action dated Sep. 21, 2017 in U.S. Appl. No. 14/601,864.
U.S. Office Action dated Jan. 23, 2017 in U.S. Appl. No. 14/601,864.
U.S. Office Action dated Oct. 20, 2015 in U.S. Appl. No. 14/601,864.

* cited by examiner

OPENING DEVICE FOR REFRIGERATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: More than one reissue application has been filed for the reissue of U.S. Pat. No. 8,398,185. The reissue applications are: application Ser. No. 14/601,864 filed on Jan. 21, 2015, which issued as Reissued U.S. Pat. No. RE47,236; and this application Ser. No. 16/230,255 filed on Dec. 21, 2018.*

This application *is an application for broadening reissue of U.S. Pat. No. 8,398,185 and is a continuation of application Ser. No. 14/601,864 filed on Jan. 21, 2015, now Reissued U.S. Pat. No. RE47,236, which is also an application for broadening reissue of U.S. Pat. No. 8,398,185, which* claims the benefit of Korean Patent Application No. 10-2008-0003319, filed on Jan. 11, 2008 in the Korean Intellectual Property Office, the disclosure of which is incorporated herein by reference.

FIELD

The present invention relates to a refrigerator, and, more particularly, to a side-by-side refrigerator having a door opening device to easily open a door of the side-by-side refrigerator.

DESCRIPTION OF THE RELATED ART

A refrigerator is an apparatus which stores food for a long period of time. The refrigerator includes a refrigeration cycle to supply cool air to a storage compartment in which the food is stored. A door is installed on the front surface of a cabinet forming the storage compartment while one side of the door is hinge-coupled to the cabinet. The cabinet and the door are formed to have a double panel structure and a thermal insulator is disposed between panels to prevent cool air in the storage compartment from being transferred to the outside.

Generally, in a side-by-side refrigerator, an inner space of the cabinet is divided into left and right sections, wherein a freezing compartment is formed on the left side and a cooling compartment is formed on the right side. Further, convenience devices such as a dispenser are provided to easily take ice or water out and a home bar provided to easily take a beverage bottle out may be mounted on doors.

A gasket is disposed at an inner peripheral portion of the door (i.e., a portion of the door which meets the cabinet) to seal between the cabinet and the door when the door is closed. The gasket is made of a hollow rubber material and is closely contacted to both sides of the cabinet and the door to prevent cool air in the storage compartment from leaking to the outside.

A user puts or takes food into or out of the storage compartment by opening and closing the door. Once the door is opened and closed, outside air is introduced into the storage compartment. The introduced outside air is gradually cooled as time goes by, and its specific volume decreases. Accordingly, the storage compartment has an inner pressure lower than an outer pressure. Thus, when the user intends to open the door again, there is a problem that the user must open the door against a pressure difference, occasionally, with a considerably large force. Particularly, in the side-by-side refrigerator having heavy doors and large-capacity storage compartments, the problem becomes more severe, and a method is required to easily open the door.

Further, since a conventional door opening device is installed to protrude from an outer surface of the door, in case of the side-by-side refrigerator having a small gap between a left door and a right door, there is a problem that the door opening device cannot be installed in the space. Even though the door opening device is installed, the door opening device interferes with an adjacent door, that is, the left door or the right door. Accordingly, there is a problem that it is very inconvenient to operate the door opening device. Thus, it is necessary to improve the door opening device such that the door opening device can be applied to the side-by-side refrigerator.

SUMMARY

Accordingly, it is an aspect of the present invention to solve the above problems. It is another aspect of the present invention to provide a door opening device of a refrigerator, which is also applicable to a side-by-side refrigerator by changing an installation method of the door opening device.

It is another aspect of the present invention to provide a door opening device of a side-by-side refrigerator, which is easily attachable to and detachable from a door by simplifying the door opening device.

It is a further aspect of the invention to provide a door opening device of a side-by-side refrigerator, which is covered to improve the beauty of an external appearance of a door.

Additional aspects and/or advantages of the invention will be set forth in part in the description which follows and, in part, will be apparent from the description, or may be learned by practice of the invention.

The foregoing and/or other aspects of the present invention may be achieved by providing a door opening device of a refrigerator which includes a cabinet and a door to open and close a front surface of the cabinet, the door opening device comprising: a handle which is mounted on a front surface of the door to perform a seesaw motion; and a push kit which is mounted on a side surface of the door to operate with the handle, wherein a portion on which the handle and the push kit are mounted is formed to be recessed in the door.

The door may include a first mounting unit which is formed to be recessed from the front surface of the door to mount the handle thereon; and a second mounting unit which is formed to be recessed from the side surface of the door to mount the push kit thereon.

The push kit may include a pushrod which is in contact with the handle; and a rod guide which guides the pushrod. The push kit may include an elastic member which is compressed by the pushrod. The elastic member may include a compression coil spring. The pushrod may be formed in a step shape. The pushrod may include a guide groove to be guided by the rod guide, and the rod guide includes a guide protrusion inserted into the guide groove. The door opening device may further include a cover which is installed on the side surface of the door to cover the push kit.

The foregoing and/or other aspects of the present invention may be achieved by providing a door opening device of a refrigerator which includes a cabinet and a door to open and close a front surface of the cabinet, the door opening device comprising: a push kit which is mounted on a side surface of the door to push the cabinet; and a handle which is mounted on a front surface of the door and performs a seesaw motion to operate with the push kit, wherein the push kit is independently mounted on the door separately from the handle, and the handle is independently mounted on the door separately from the push kit.

The door may include a second mounting unit to mount the push kit thereon, and the push kit is inserted and coupled to the second mounting unit. The push kit may include a protrusion which is inserted into the second mounting unit, and the second mounting unit includes a groove to receive the protrusion. The door may include a support member which supports the handle to enable a seesaw motion of the handle, and the handle is inserted and coupled to the support member. The handle may be hinge-coupled with the support member, the handle includes a hinge hole portion coupled to the support member, and the support member includes a hinge shaft inserted into the hinge hole portion. A torsion spring may be installed between the handle and the support member.

In accordance with a further aspect of the present invention, there is provided a side-by-side refrigerator comprising: a cabinet including left and right storage compartments; a left door and a right door which open and close the left and right storage compartments, respectively; and door opening devices which are respectively installed on the left door and the right door to easily open the left door and the right door, wherein the door opening devices include handles installed on front surfaces of the left door and the right door, and pushrods installed on side surfaces of the left door and the right door to interwork with the handles, respectively, and the pushrod installed on the left door and the pushrod installed on the right door are [arranged diagonally] *vertically offset* relative to each other.

In the side-by-side refrigerator according to the embodiment of the present invention, the door opening devices are installed to be recessed in the doors, thereby improving the external appearance.

Further, the door opening devices of the side-by-side refrigerator prevent interference with an adjacent door by reducing a rotation radius.

Further, in the door opening devices of the side-by-side refrigerator, when the door opening devices are out of order due to breakage or the like, it is very easy to replace and repair the door opening devices by simplifying the structure. Thus, it is very convenient in use.

Further, in the door opening devices of the side-by-side refrigerator, the user senses smooth operation due to the use of the compression coil spring and the torsion spring.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE EMBODIMENTS

Figure 1:
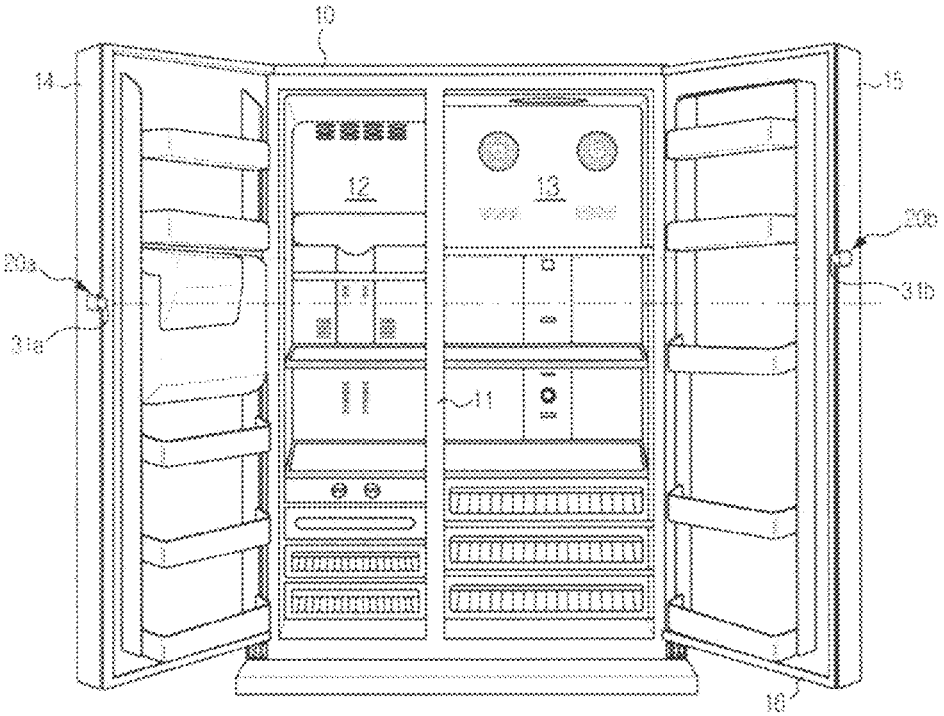
FIG. 1 illustrates a perspective view showing an external appearance of a side-by-side refrigerator according to an embodiment of the present invention.

Reference will now be made in detail to an exemplary embodiment of the present invention, an example of which is illustrated in the accompanying drawings, wherein like reference numerals refer to like elements throughout. The embodiment is described below to explain the present invention by referring to the figures.

Hereinafter, a side-by-side refrigerator according to an embodiment of the present invention will be described in detail with reference to the accompanying drawings.

FIG. 1 illustrates a perspective view showing an external appearance of the side-by-side refrigerator according to the embodiment of the present invention.

As shown in FIG. 1, the side-by-side refrigerator according to the embodiment of the present invention includes a cabinet 10. The cabinet 10 includes storage compartments 12 and 13. The storage compartments 12 and 13 are defined on the opposite left and right sides by a vertically extended intermediate partition wall 11. Two doors 14 and 15 are installed on the front surface of the cabinet 10 to open and close the two storage compartments 12 and 13 disposed on the left and right sides, respectively. The left door 14 includes a left end serving as a fixed end, wherein upper and lower left end portions are hinge-coupled to the cabinet 10, and a right end serving as a free end. On the contrary, the right door 15 includes a right end serving as a fixed end, wherein upper and lower right end portions are hinge-coupled to the cabinet 10, and a left end serving as a free end. Generally, the storage compartment 12 of the left side is a freezing compartment and the storage compartment 13 of the right side is a cooling compartment.

Gaskets 16 are installed at portions of the left door 14 and the right door 15 which meet the cabinet 10. The gaskets 16 improve a sealing force between the cabinet 10 and the doors 14 and 15 to prevent cool air from flowing out of the storage compartments 12 and 13. Further, although not shown in the drawings, magnets are inserted into the gaskets 16 to improve a sealing force between the cabinet 10 and the doors 14 and 15. As described in the conventional technology, the storage compartments 12 and 13 have an inner pressure that is lower than an outer pressure. Accordingly, the side-by-side refrigerator includes door opening devices 20a and 20b to easily open the doors 14 and 15 against a sealing force and a pressure difference. The door opening devices 20a and 20b are disposed at the free ends of the left door 14 and the right door 15, respectively.

Each of the door opening devices 20a and 20b includes a pushrod which moves forward and backward on each side surface of the left door 14 and the right door 15. The pushrod moves forward to push the cabinet 10. Accordingly, when the pushrod is installed at an extreme end of each free end of the doors 14 and 15, it is possible to obtain a relatively high moment, thereby easily opening the doors 14 and 15 with a smaller force. However, since there is a small gap between the left door 14 and the right door 15 when the doors 14 and 15 are closed, if a pushrod 31a installed at the left door 14 and a pushrod 31b installed at the right door 15 are arranged in parallel, interference may be generated between the pushrods 31a and 31b. Thus, the pushrod 31a installed at the left door 14 and the pushrod 31b installed at the right door 15 are [disposed diagonally] *vertically offset* relative to each other to prevent interference from being generated between the pushrods 31a and 31b.

Figure 2:
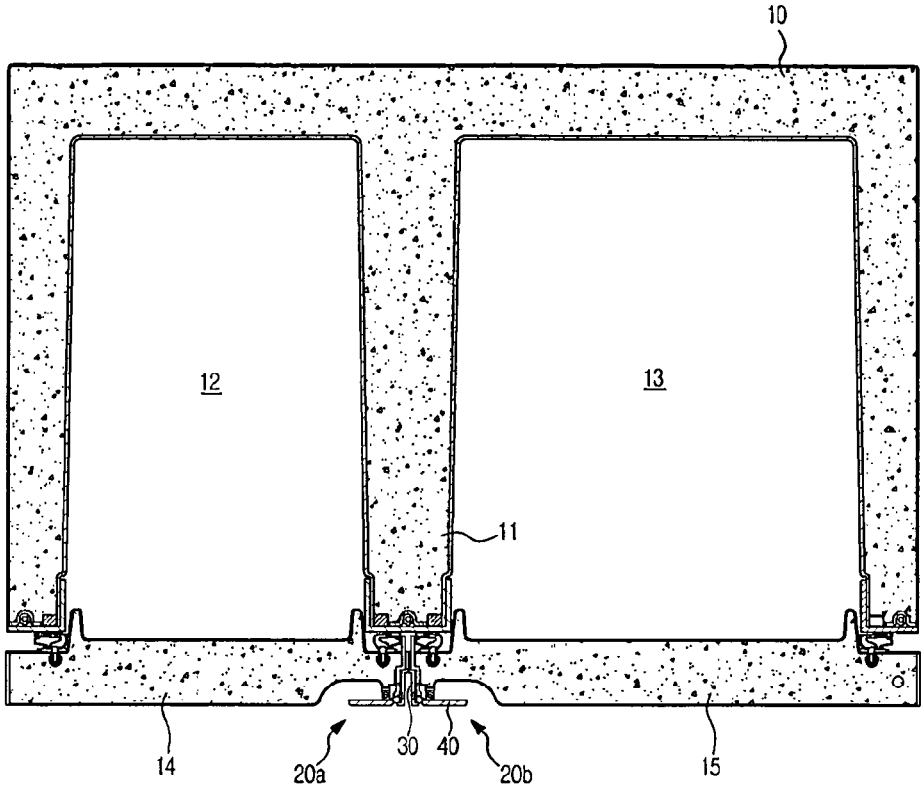
FIG. 2 illustrates a transverse cross-sectional view of door opening devices according to the embodiment of the present invention.

FIG. 2 illustrates a transverse cross-sectional view showing the door opening devices according to the embodiment of the present invention.

As shown FIG. 2, when the doors 14 and 15 close the front surface of the cabinet 10, the free end of the left door 14 meets the intermediate partition wall 11 and the free end of the right door 15 also meets the intermediate partition wall 11. The free ends of the left door 14 and the right door 15 are positioned very close to each other. Since the door opening devices 20a and 20b are respectively installed at the free ends of the left door 14 and the right door 15, the door opening device 20a installed at the free end of the left door 14 may interfere with the right door 15 and the door opening device 20b installed at the free end of the right door 15 may interfere with the left door 14. Since the door opening devices 20a and 20b installed at the free ends of the left door 14 and the right door 15 are symmetric to each other, the door opening device 20b installed at the free end of the right door 15 must be arranged so as not to interfere with the left door 14, as described in detail as an example.

Referring to FIG. 1, the side-by-side refrigerator has the door 15 having a very large size and weight. On the contrary, the door opening device 20b used to open the door 15 is relatively very small. When the user applies a large force or impact to the door opening device 20b to open the door 15, the door opening device 20b may be damaged and it would be necessary to replace and repair the door opening device 20b. Hereinafter, there will be described the door opening device 20b which is simplified for easy replacement and repair.

Further, in the side-by-side refrigerator, the door 15 is disposed on the front surface of the cabinet 10. Since the door 15 is always exposed to the outside, the aesthetic characteristics of an external appearance of the door 15 are important. Particularly, the door opening device 20b used to open the door 15 has a large effect on the aesthetic characteristics of the door 15. As shown in FIG. 2, in the side-by-side refrigerator of this embodiment, the door opening device 20b is installed to be recessed from the outer surface of the door 15 such that the door opening device 20b does not protrude from the front surface of the door 15. Further, the door opening device 20b is covered to maintain a neat external appearance of the door 15.

First, the door opening device 20b is mounted *to the door 15 at a mounting location spaced* inwardly relative to the outer surface of the door 15 by a predetermined depth. The door opening device 20b includes a push kit 30 and a handle 40. The push kit 30 is mounted inwardly from the side surface of the door 15 by a predetermined depth. The handle 40 is mounted *to the door 15 at a mounting location spaced* inwardly from the front surface of the door 15 by a predetermined depth. In other words, a portion, on which the push kit 30 and the handle 40 are mounted, is recessedly formed in the door 15.

Figure 3:
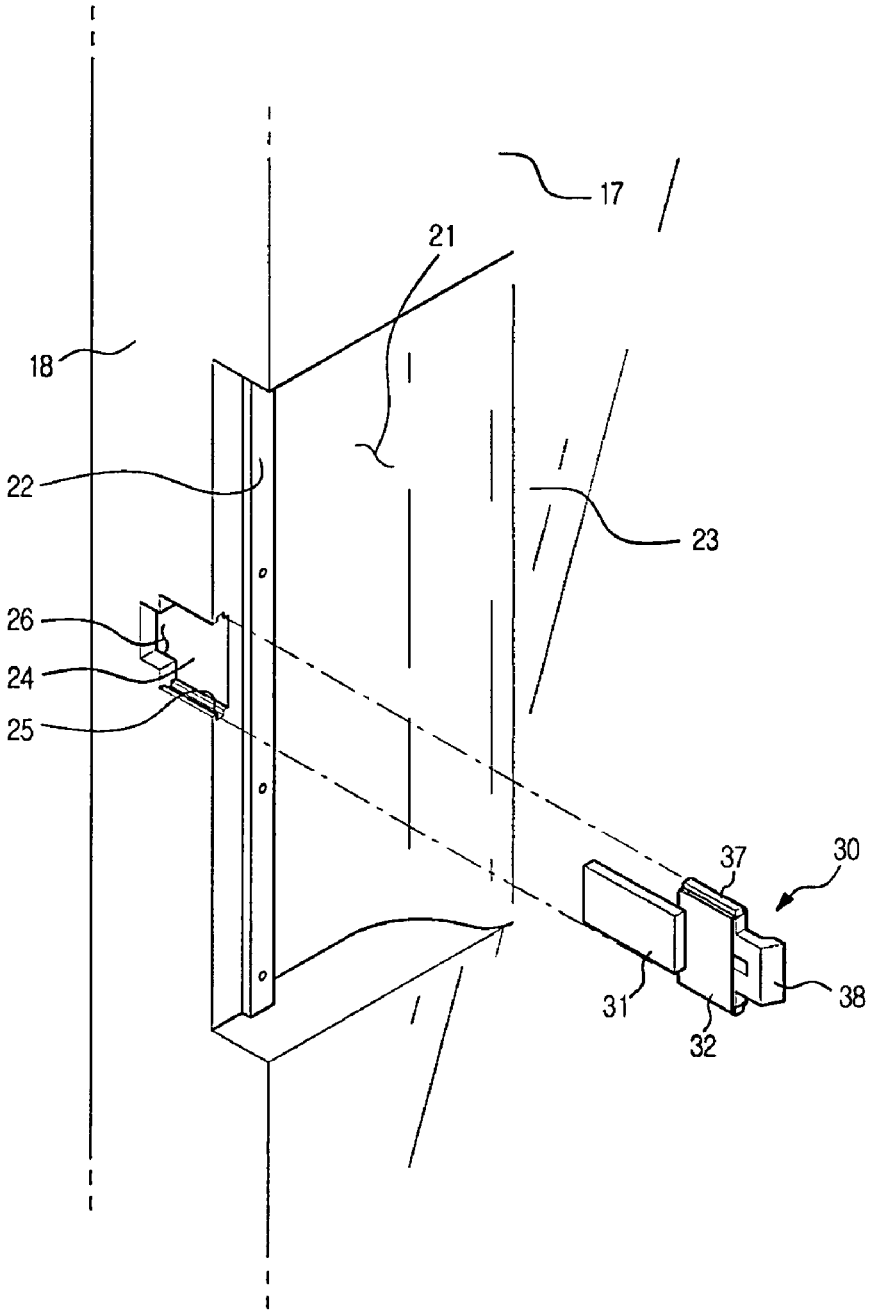
FIG. 3 illustrates a separated perspective view showing a state before a push kit is installed on a door according to the embodiment of the present invention.

FIG. 3 illustrates a separated perspective view showing a state before the push kit 30 is installed on the door according to the embodiment of the present invention.

Figure 5:
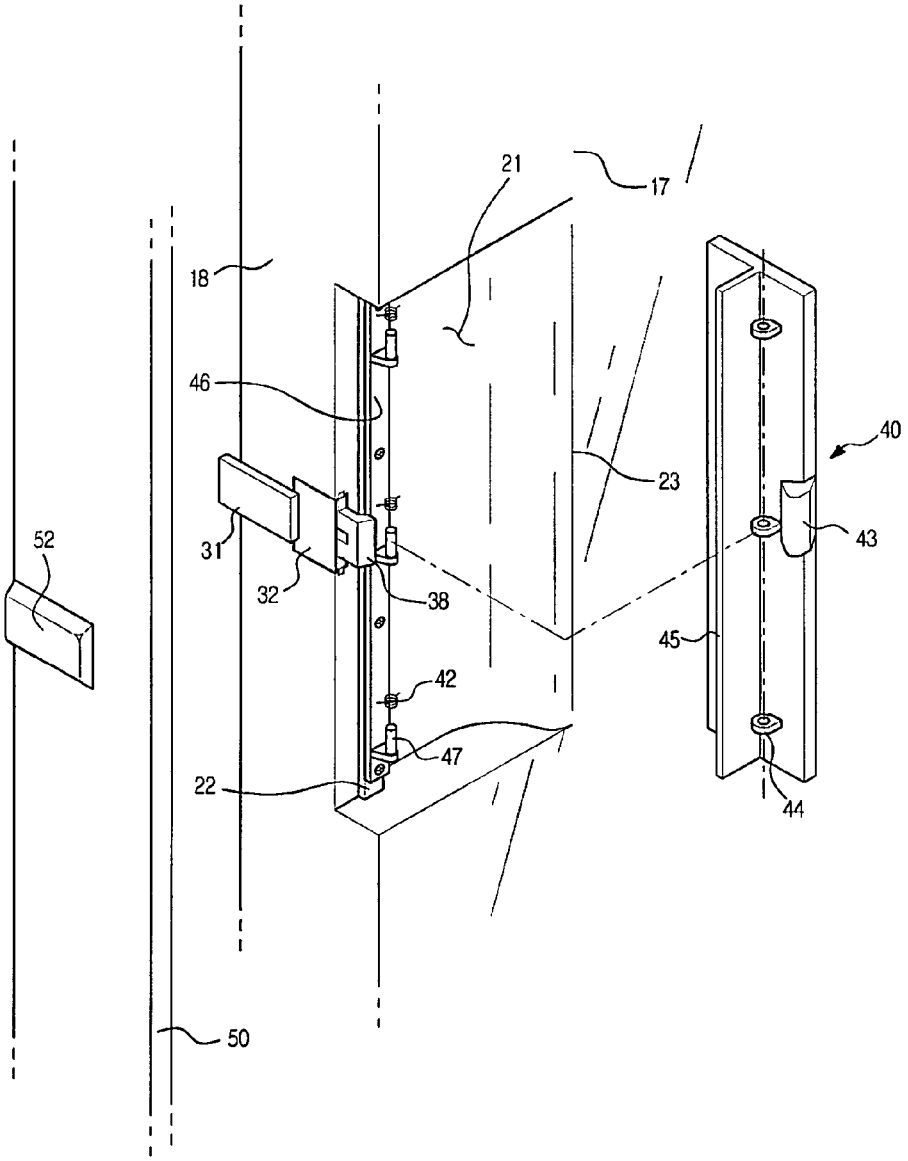
FIG. 5 illustrates a separated perspective view showing a state before a handle is installed on the door according to the embodiment of the present invention.

As shown in FIG. 3, a first mounting unit 21 is formed on a front surface 17 of the door 15 to be recessed by a predetermined depth to mount the handle 40 (see FIG. 5). A second mounting unit 24 is formed on a side surface 18 of the door 15 to be recessed by a predetermined depth to mount the push kit 30.

The push kit 30 is independently mounted on the side surface 18 of the door 15 separately from the handle 40 (see FIG. 5). The push kit 30 is inserted and coupled to the second mounting unit 24. For example, protrusions 37 are formed at the upper and lower sides of the push kit 30 to be protruded and inserted into the second mounting unit 24, and grooves 25 are formed on the second mounting unit 24 to receive the protrusions 37, thereby easily mounting the push kit 30 on the second mounting unit 24. Accordingly, an operator can easily couple the push kit 30 to the second mounting unit 24 or separate the push kit 30 from the second mounting unit 24.

Figure 4:
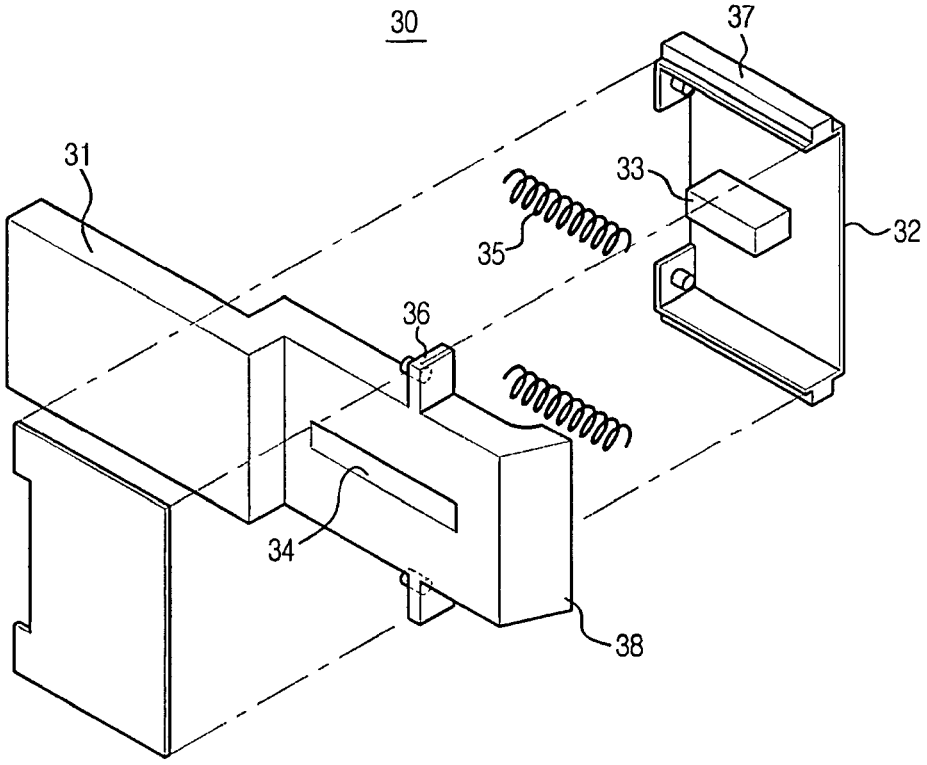
FIG. 4 illustrates an exploded perspective view of the push kit according to the embodiment of the present invention.

FIG. 4 illustrates an exploded perspective view of the push kit 30 according to the embodiment of the present invention.

As shown in FIG. 4, the push kit 30 includes the pushrod 31 formed in a step shape and a rod guide 32 which guides the pushrod 31 to move forward and backward. The rod guide 32 is formed in two separate [steps] *pieces*, which *pieces* are coupled to each other. In a coupling state of the rod guide 32, a guide protrusion 33 protrudingly formed on the rod guide 32 is inserted into a guide groove 34 formed on the pushrod 31. Accordingly, the pushrod 31 can be guided to move forward and backward by the rod guide 32.

Elastic members 35 are disposed between the pushrod 31 and the rod guide 32. For example, compression coil springs are used as the elastic members 35. Wing portions 36 are formed on the opposite side surfaces of the pushrod 31 to support the compression coil springs 35. The compression coil springs 35 are compressed by the wing portions 36 as the pushrod 31 moves forward. The pushrod 31 returns to its original position by a restoration force of the compressed compression coil springs 35. In this process, since the compression coil springs 35 provide a buffering effect, the compression coil springs 35 provide a buffering effect on a reciprocating motion of the pushrod 31. Thus, it is possible to further smoothly operate the door opening device 20b.

As a result, the push kit 30 is formed as one kit by coupling the pushrod 31, the rod guide 32 and the compression coil springs 35. Thus, as shown in FIG. 3, the push kit 30 can be coupled to or separated from the door 15 by simply inserting or taking the push kit 30 into or out of the second mounting unit 24.

Further, as shown in FIG. 3, a reciprocating space 26 is provided in the second mounting unit 24 such that the pushrod 31 can reciprocate. Since the pushrod 31 reciprocates after the push kit 30 is mounted on the second mounting unit 24, it requires a space to allow a reciprocating motion of the pushrod 31.

FIG. 5 illustrates a separated perspective view showing a state before the handle is installed on the door according to the embodiment of the present invention.

As shown in FIG. 5, when the push kit 30 is coupled to the second mounting unit 24, the handle 40 is mounted on the first mounting unit 21 to communicate with the push kit 30.

The first mounting unit 21 is formed at a portion adjacent to the second mounting unit 24 which is formed to be recessed from the side surface of the door 15. A left leading end 22 and a right leading end 23 of the first mounting unit 21 are formed to have different [heights] *depths*. That is, the right leading end 23 is formed on the same plane as the front surface of the door 15, whereas the left leading end 22 is formed to have a lower [height] *depth* than that of the right leading end 23 since the handle 40 is mounted on the left leading end 22. Accordingly, it is possible to prevent the handle 40 from being protruding too far from the front surface 17 of the door 15 even though the handle 40 is mounted on the door 15.

A support member 46 is coupled to the left leading end 22 of the first mounting unit 21 to support the handle 40 such that the handle 40 can perform a seesaw motion. The support member 46 is vertically installed along the left leading end 22 of the first mounting unit 21. The support member 46 may be formed as a separate member to be coupled with the left leading end 22 or may be formed as a single body with the left leading end 22. The support member 46 and the handle 40 are formed such that they are inserted and coupled to each other. That is, the handle 40 and the support member 46 have a simple coupling structure.

The handle 40 is independently mounted on the front surface of the door 15 separately from the push kit 30, and the handle 40 is hinge-coupled to the support member 46. That is, the handle 40 includes hinge hole portions 44 formed to be protruded in a ring shape and hinge shafts 47 forming a shaft of the support member 46. Since upper ends of the hinge shafts 47 are open, the hinge shafts 47 can be easily inserted to hinge hole portions 44. That is, since the hinge shafts 47 are simply inserted and coupled to the hinge hole portions 44, it is very easy to couple or separate the handle 40 to or from the support member 46.

Torsion springs 42 are installed between the support member 46 and the handle 40. That is, the torsion springs 42 are inserted into the hinge shafts 47 of the support member 46 to support the handle 40. Accordingly, if the operator rotates the handle 40, the torsion springs 42 are compressed, and if the operator releases the handle 40, the handle 40 returns its original position by a restoration force of the torsion springs 42. Since the torsion springs 42 are installed at rotation shafts around which the handle 40 performs a seesaw motion, it is possible to improve an operation feeling of the operator when the operator rotates the handle 40.

Since the hinge hole portions 44 are installed at positions at which the handle 40 can perform a seesaw motion, the handle 40 moves within a small range. That is, since the handle 40 performs a seesaw motion only on the front surface of the door 15, a rotation radius of the handle 40 is limited. Since the handle 40 is not protruded from the side surface 18 of the door 15 even though the handle 40 is rotated, it is possible to prevent the handle 40 from interfering with the other door 14 (see FIG. 2) adjacent to the handle 40.

The push kit 30 is mounted on the side surface 18 of the door 15, and the pushrod 31 is installed to be movable forward and backward. The handle 40 is installed on the front surface 17 of the door 15 such that the handle 40 can interwork with the pushrod 31. A pressing portion 43 is formed on the handle 40 and a contact portion 38 is formed on the pushrod 31 such that the pressing portion 43 is in contact with the contact portion 38.

A cover 50 is installed on the side surface 18 of the door 15 such that a contact state of the pushrod 31 and the handle 40 is not exposed to the user's eyes. The cover 50 serves to cover a portion of the push kit 30 and the handle 40. Further, the pushrod 31 is formed in a step shape, and a portion of the pushrod 31 is installed to protrude from the side surface 18 of the door 15 *outside the respective gasket 16*. A protruded portion 52 is formed on the cover 50 to cover the pushrod 31 protruded from the side surface 18 of the door 15 *towards the small gap between the doors 14 and 15*. Accordingly, the cover 50 serves to maintain a neat external appearance of the door 15. *As the respective pushrods 31 are vertically offset relative to each other to prevent interference from being generated between the respective pushrods 31, the respective protruded portions 52 are also vertically offset with differing heights relative to each other to prevent interference from being generated between the respective protruded portions 52.*

Figure 6:
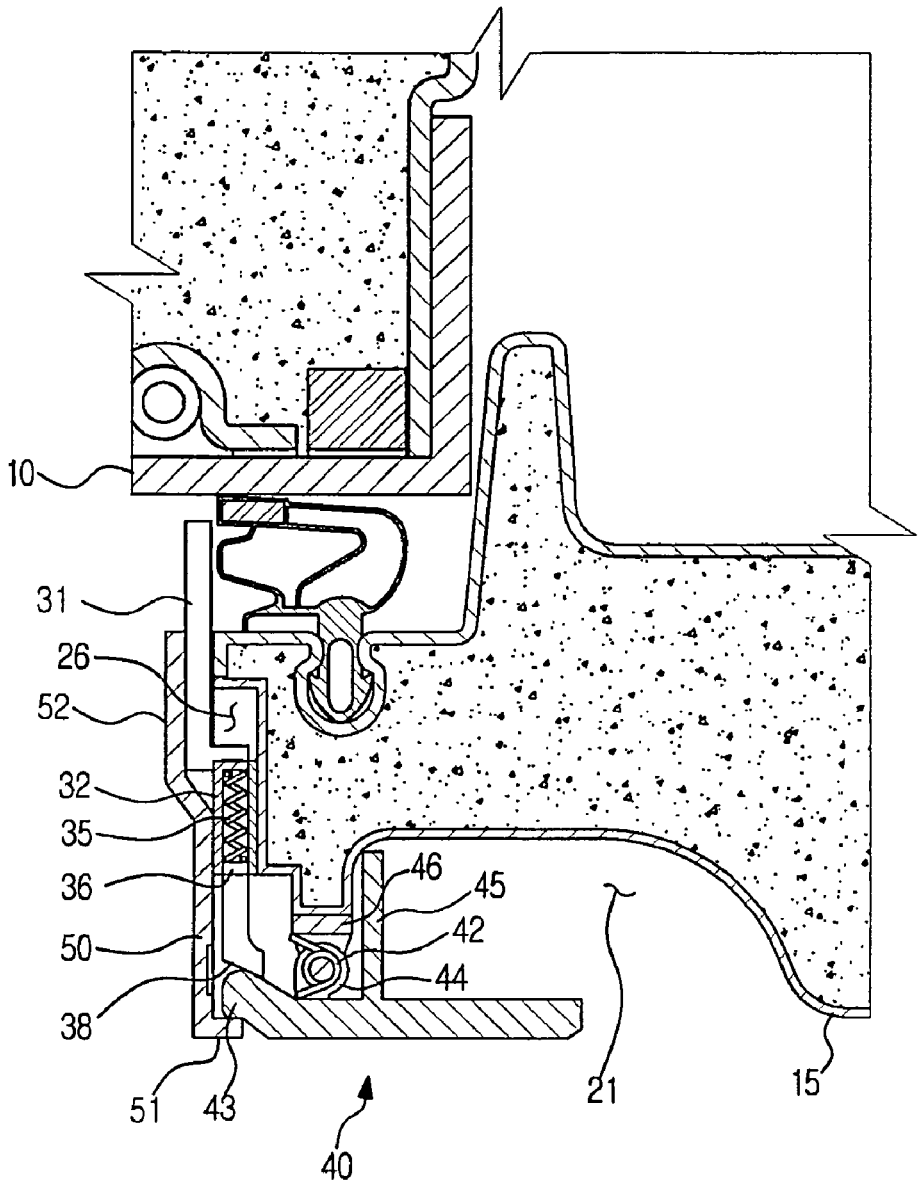
FIG. 6 illustrates a transverse cross-sectional view showing a state where the door opening device according to the embodiment of the present invention is installed on the door.

FIG. 6 illustrates a transverse cross-sectional view showing a state where the door opening device according to the present invention is installed on the door.

As shown in FIG. 6, when the push kit 30 and the handle 40 are mounted on the door 15, the pushrod 31 and the handle 40 are maintained in a contact state. Specifically, the contact portion 38 of the push kit 30 and the pressing portion 43 of the handle 40 are only in contact with each other to transfer a driving force and are not coupled to each other. Accordingly, the push kit 30 and the handle 40 are separately formed to be independently attached to and detached from the door.

The contact portion 38 is formed to be inclined. However, the inclination of the contact portion 38 is not necessarily required. That is, even when the contact portion 38 is not inclined, there is no problem in embodying the door opening device 20b. However, it is possible to adjust a distance by which the pushrod 31 moves forward by adjusting an inclination angle of the contact portion 38. Further, a shape of the pressing portion 43 which slides on the contact portion 38 also has an effect on the distance by which the pushrod 31 moves forward. Thus, the distance by which the pushrod 31 should move forward to push the cabinet 10 can be adjusted by varying the inclination of the contact portion 38 and the shape of the pressing portion 43.

Consequently, the structure in which the push kit 30 is simply inserted and coupled to the second mounting unit 24 and the structure in which the handle 40 is simply inserted and coupled to the support member 46 are applied to the embodiment of the present invention. Further, the embodiment of the present invention discloses the structure in which the push kit 30 is independently mounted on the second mounting unit 24 and the structure in which the handle 40 is independently mounted on the support member 46. That is, in case of using the engaging and coupling structure and the independently mounting structure, it is very easy to replace or repair the push kit 30 and the handle 40.

Hereinafter, an operation of the door opening device of the side-by-side refrigerator according to the embodiment of the present invention will be described in detail with reference to FIGS. 6 and 7.

Figure 7:
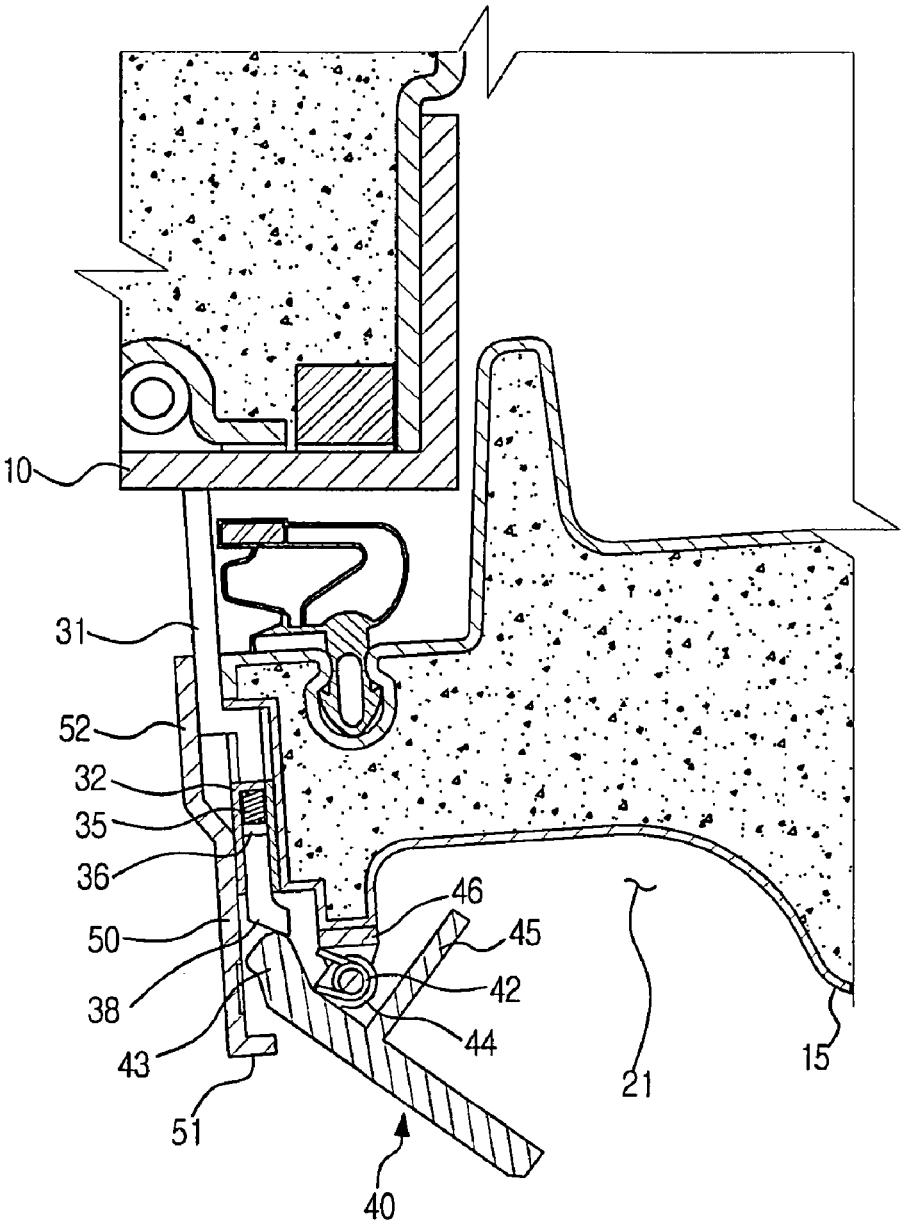
FIG. 7 illustrates a transverse cross-sectional view showing a state in which the door opening device according to the present invention is installed on the right door and operated.

FIG. 7 illustrates a transverse cross-sectional view showing a state in which the door opening device according to the embodiment of the present invention is installed on the right door and operated.

FIG. 6 illustrates an initial state of the door opening device 20b, and FIG. 7 illustrates an operational state of the door opening device 20b.

As shown in FIG. 7, when the user puts a hand into the first mounting unit 21 and then rotates the handle 40, the pressing portion 43 presses the contact portion 38 to move the pushrod 31 forward *in cooperation with the handle 40 to press against the intermediate partition wall 11*. Resultantly, the pushrod 31 pushes the cabinet 10 and the door 15 is opened by a reaction force, thereby removing a sealing force between the door 15 and the cabinet 10 and also removing a difference between an inner pressure and an outer pressure of the cabinet 10. Thus, the user can easily open the door 15.

Further, the pushrod 31 moves forward to compress the compression coil springs 35 installed between the pushrod 31 and the rod guide 32, and the handle 40 is rotated to compress the torsion springs 42 installed between the handle 40 and the support member 46. The buffering effects of the compression coil springs 35 and the torsion springs 42 improve an operation feeling in operating the door opening device 20b.

As shown in FIG. 6, when the user releases the handle 40, the compressed compression coil springs 35 and the torsion springs 42 are extended. The pushrod 31 returns to its original position by a restoration force of the compression coil springs 35, and the handle 40 returns to its original position by a restoration force of the torsion springs 42.

When the handle 40 returns *to* an initial position, the pressing portion 43 of the handle 40 is in close contact with a first stopper 51 of the cover 50. That is, the first stopper 51 prevents the handle 40 from being inclined deeply toward the first mounting unit 21 against the restoration force of the compression coil springs 35 and the torsion springs 42. Further, the handle 40 includes a second stopper 45 to prevent the handle 40 from being inclined toward the first mounting unit 21. That is, the second stopper 45 is in contact with a portion of the door 15 in which the first mounting unit 21 is formed, thereby stopping the handle 40 against restoration force of the compression coil springs 35 and the torsion springs 42.

If the first stopper 51 or the second stopper 45 capable of preventing the handle 40 from being excessively inclined is not provided, the handle 40 would be inclined toward the first mounting unit 21. In this case, it [is] *would be* inconvenient for the user to hold the handle 40, thereby reducing satisfaction of the product.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A refrigerator comprising*:* a cabinet having left and right storage compartments partitioned by [an intermediate] *a* partition wall; *and* left and right doors [hingedly] coupled to the cabinet to open [and] *or* close [front surfaces of] the left and right storage compartments[; and],

*wherein:* a gap *is* formed between the left door and the right [doors] *door*, *and*

[wherein] each of the left and right doors is provided [at a front part thereof] with a *respective* door opening device [to assist a user to open each of the left and right doors],

[the] *wherein each* door opening device comprises a handle mounted on [a front surface of] the *respective* door to move forward [and backward] according to user manipulation [to open the door], *and* a push kit mounted on a *recessed* side portion [of a side surface] of the *respective* door [to cooperate with the handle], [and]

[a cover mounted on the door to cover the push kit and to entirely cover the side surface of the door,]

[the] *wherein each* push kit [has] *includes* a pushrod [bent] *disposed* at an outside of a gasket provided at a rear of the *respective* door so that the pushrod [moves forward and backward to act on the intermediate partition wall and] *cooperates with the handle of the respective door to press against the partition wall, and* a rod guide to guide an operation of the pushrod, [and the] *wherein each of the left and right doors includes a respective cover,*

*wherein each* cover *is mounted on the respective door to cover the push kit of the respective door and to cover a side surface of the respective door, and* has a protruded portion protruded to cover the pushrod *included in the push kit of the respective door*, the protruded portion of the *cover of the* right door and the protruded portion of the *cover of the* left door being protruded toward the gap and being located at different heights so that one of the left and right doors does not interfere with the other [when opened], *and*

[the pushrod and rod guide are] *wherein each push kit is* independently mounted on the *respective* door separately from the handle *of the respective door*, and the handle *of the respective door* is independently mounted on the *respective* door [separately from the pushrod and the rod guide].

[2. The refrigerator according to claim 1, wherein each of the doors comprises:

a first mounting unit formed to be recessed from the front surface of each of the doors to mount the handle thereon; and a second mounting unit formed to be recessed from the side surface of each of the doors to mount the push kit thereon.]

3. The refrigerator according to claim 1, wherein *each of* the push [kit] *kits* comprises an elastic member [compressed] *compressible* by the *respective* pushrod.

4. The refrigerator according to claim 3, wherein *each of* the elastic [member] *members* comprises a compression coil spring.

5. The refrigerator according to claim 1, wherein *each of* the [handle] *handles* has a pressing portion to press the *respective* pushrod according to the user manipulation.

6. A door opening device of a refrigerator comprising a cabinet *having a first storage compartment and a second storage compartment partitioned from the first storage compartment by a partition wall*, [two doors] *and a first door and a second door* to open [and] *or* close [a front surface of] the cabinet, *wherein there is* a gap between the [two doors, and each of the two doors having a door opening device] *first door and the second door when the doors are closed*, *and* wherein*:* the door opening [devices are mounted at a front part of each of] *device is mountable on* the [doors to assist a user to open the doors, respectively] *first door*,

[each of the] the door opening [device comprises] *device comprises* a handle [mounted] *mountable* on [a front surface of] the *first* door to move forward [and backward] according to user manipulation [to open the door], *and* a push kit [mounted] *mountable* on a *recessed* side portion [of a side surface] of the *first* door [to cooperate with the handle, and a cover mounted on the door to cover the push kit and to cover the side surface of the door], the push kit has a pushrod [bent] *disposable* at an outside of a gasket provided at a rear of the *first* door so that the pushrod [moves forward and backward to act on the cabinet] *cooperates with the handle of the first door to press against the partition wall* and a rod guide to guide an operation of the pushrod, the [pushrod and the rod guide are] *push kit is* independently [mounted] *mountable* on the *first* door separately from the handle, and the handle is independently [mounted] *mountable* on the *first* door [separately from the pushrod and the rod guide],

[each of the doors] *the first door* comprises a first mounting unit [formed to be] recessed from [the] *a* front surface of the *first* door to mount the handle thereon [and], a second mounting unit [formed to be] recessed from [the] *a* side surface of the *first* door to mount the push kit thereon, *and a first cover mountable on the first door to cover the push kit and to cover the side surface of the first door*, the rod guide is [fixed] *coupled* to the [side surface of the door, and the pushrod moves forward and backward with respect to the rod guide] *pushrod*, the push kit comprises an elastic member [compressed] *compressible* by the pushrod, and the *first* cover has a protruded portion protruded to cover the pushrod, *and* the protruded portion of the [one of the two doors] *first cover* and [the] *a* protruded portion of [the other of the two doors being] *a second cover of the second door are* protruded toward the gap and [being] *are* located at different heights so that one of the [left] *first* and [right] *second* doors does not interfere with the other [when opened].

7. The door opening device according to claim 6, wherein the push kit comprises a protrusion which is [inserted] *insertable* into the *second* mounting unit, and the *second* mounting unit comprises a groove to receive the protrusion.

8. The door opening device according to claim 6, wherein [each of the doors] *the first door* further comprises a support member which supports the handle to enable [the] *a* seesaw motion of the handle, and the handle is [inserted and] coupled to the support member.

9. The door opening device according to claim 8, wherein the handle is hinge-coupled with the support member, the handle includes a hinge hole portion coupled to the support member, and the support member includes a hinge shaft inserted into the hinge hole portion.

* * * * *